FRAME AND TRUNK SELECTION

Filed Oct. 29, 1948 3 Sheets-Sheet 1

INVENTOR
R. E. HERSEY
BY P. C. Smith
ATTORNEY

FRAME AND TRUNK SELECTION

Filed Oct. 29, 1948 3 Sheets-Sheet 2

INVENTOR
R. E. HERSEY
BY P. C. Smith
ATTORNEY

FRAME AND TRUNK SELECTION

Filed Oct. 29, 1948 3 Sheets-Sheet 3

INVENTOR
R. E. HERSEY
BY P. C. Smith
ATTORNEY

Patented Oct. 30, 1951 2,573,569

UNITED STATES PATENT OFFICE 2,573,569

FRAME AND TRUNK SELECTION

Ralph E. Hersey, Madison, N. J., assignor to Bell Telephone Laboratories, Incorporated, New York, N. Y., a corporation of New York Application October 29, 1948, Serial No. 57,396

17 Claims. (Cl. 179—18)

Figure 1:
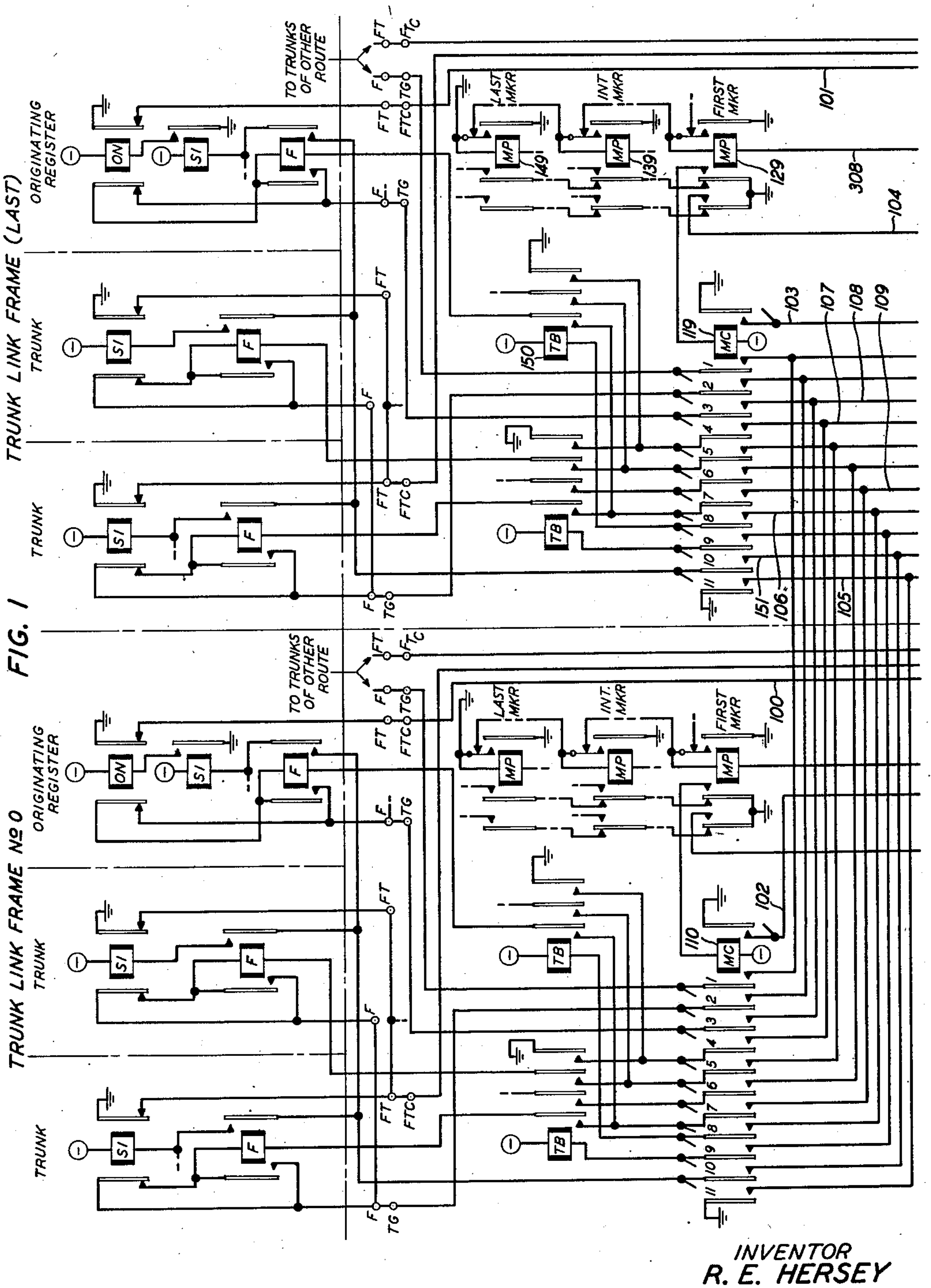

This invention relates to a dial switching telephone system and more particularly to the selection of an idle trunk of a desired trunk group in a system of the so-called cross bar type.

The invention is specifically applicable to a system of the type disclosed in the application of A. J. Busch, Serial No. 57,394, filed concurrently herewith. In this system all types of calls, either intraoffice, special service, outgoing or incoming, are established over the cross bar switches of trunk link frames. In an office installation involving no extension switches, ten trunk link frames are provided, each having ten two hundred point, three-wire cross bar switches comprising a junctor bay and ten two hundred point, six-wire cross bar switches comprising a trunk bay. These switches are of the general type disclosed for example in Patent No. 2,021,329, granted November 15, 1935, to J. N. Reynolds, but are each provided with twenty verticals.

The junctor switch horizontals of each junctor switch are divided into left and right halves so that the ten junctor switches on each trunk link frame provide two hundred horizontals. These horizontals are connected by junctors to the verticals of the junctor switches on the line link frames. The trunk link frames are thus given access to all of the line link frames, of which there may be as many as twenty, for extending originating or terminating connections to subscribers' lines which terminate in line switches of the line link frames. The verticals of the junctor switches on each trunk link frame are connected by two hundred three-wire trunk links to the two hundred verticals of the trunk switches on the same frame.

The ten trunk switches of each trunk link frame are six-wire switches and the horizontals of each switch are divided into right and left halves. The verticals on the left halves of the junctor switches are connected by links to the verticals on the left halves of the trunk switches and the verticals on the right halves of the junctor switches are connected by links to the verticals on the right halves of the trunk switches. This wiring is arranged so that any vertical in the junctor bay has access to all ten trunk switches in the trunk bay.

The trunks connect to the horizontals or levels of the trunk switches. There are two trunk appearances per level for levels two to nine of the ten trunk switches of each frame. The two appearances per level are obtained by using a six-wire switch, that is, having six pairs of contacts in each cross-point contact set, and operating an A or B select magnet (select magnet position 0 or 1) respectively, in addition to a T or trunk select magnet associated with one of the levels 2 to 9 on which a trunk to be connected with appears. The A or B select magnet controls cross-points which connect a link incoming from a junctor switch to one or the other of two vertical multiples, each made up from one half of the contacts of a vertical row of cross-point contact sets. Each vertical multiple thus formed comprises a tip, ring and sleeve. The trunk select magnet controls cross-points which connect two horizontal tip, ring and sleeve multiples (corresponding to two link appearances) to the two vertical multiples but, as just explained, only one vertical multiple is connected to a link. In this manner, sixteen trunk appearances are provided per trunk switch or one hundred and sixty for a trunk link frame.

Appearances connected by an A select magnet are called A appearances and those by a B select magnet ore called B appearances. Intraoffice trunks require two appearances. The calling end of each intraoffice trunk is on an A appearance and the called end is on a B appearance but these appearances are, for each such trunk, on the same level of different trunk switches of the same frame. Incoming trunks and other trunks requiring ringing are on B appearances. Originating registers and outgoing trunks may be on either A or B appearances.

The trunk link frames and line link frames are involved in dial tone, intraoffice, outgoing, incoming and reverting calls. On dial tone calls for which an originating register is connected to a calling line to supply the calling subscriber with dial tone and to receive and register digits dialed by the calling subscriber for the use of a marker in establishing desired connections, the calling line is connected to an available originating register over a channel. On intraoffce calls the calling subscriber is connected to the calling end of an intraoffice trunk by one channel and the called party is connected to the other end of the trunk by another channel. On outgoing calls the calling line is connected by a channel to the selected outgoing trunk. On an incoming call the incoming trunk is connected by a channel to the called line. On a reverting call the line associated with both the calling and called stations is connected over a channel to a reverting call trunk.

Of the one hundred and sixty trunk appearances on the ten trunk switches of a frame, forty are used for incoming type trunks and the terminating appearances of intraoffice trunks. The remaining one hundred and twenty trunk appearances are reached under the direction of the route relays of markers and these may be allocated to a maximum of sixty routes per frame. These routes are numbered from 00 to 59 and may comprise originating registers, groups of trunks outgoing directly to other terminating offices or to tandem offices, intraoffice trunks, a group of reverting ringing trunks or various service trunks. The marker marks the registers or trunks of a particular one of these routes by operating a trunk block relay of which six are provided in each trunk link frame. Each of these trunk block relays has access to the busy test leads of twenty trunks or registers so that through the operation of any one of these relays, the testing of a group of twenty trunks or registers for idle ones may be accomplished by the marker.

The registers or trunks made accessible for testing by each trunk block relay may be assigned to a single route or to several routes. The grouping of the registers or trunks into routes is determined by multiplying frame leads individual to registers or trunks, which are to be assigned to the same route, to a trunk group lead over which the marker determines that the registers or trunks so connected are to be tested as a single group and that for the particular connection the testing of other trunk groups made available for testing by the operated trunk block relay is to be ignored. To enable the assignment of twenty trunks made available for testing by any one trunk block relay into twenty different trunk groups, twenty trunk group leads are provided whereby a connected marker may determine one or more of the trunks to be tested.

The trunks of any route may be distributed over the appearances of one or more of the trunk switches of one or more trunk link frames and it is generally desirable to make this distribution as wide as possible in order to insure the greatest accessibility to the trunks of the route. As previously stated, the trunks have appearances only in the levels 2 to 9 inclusive of the trunk switches and it is desirable, although not necessary, that the trunks of any one route be distributed over the same levels of the several switches on a frame.

As a typical example, outgoing trunks and originating registers could be assigned to the A appearances of the second levels of the trunk switches and outgoing trunks, incoming trunks or reverting ringing trunks to the B appearances of the second levels; outgoing trunks to the A appearances and outgoing trunks, incoming trunks and reverting ringing trunks to the B appearances of the third levels; outgoing trunks to the A appearances and outgoing trunks, incoming trunks and reverting trunks to the B appearances of the fourth levels; outgoing trunks to the A appearances and outgoing trunks, incoming trunks and reverting trunks to the B appearances of the fifth levels; outgoing trunks and the originating ends of intraoffice trunks to the A appearances and the terminating ends of intraoffice trunks and incoming trunks to the B appearances of the sixth levels; outgoing trunks, and the originating ends of intraoffice trunks to the A appearances and the terminating ends of intraoffice trunks and incoming trunks to the B appearances of the seventh levels; outgoing trunks and the originating ends of intraoffice trunks to the A appearances and the terminating ends of intraoffice trunks and incoming trunks to the B appearances of the eighth levels; and outgoing trunks and the originating ends of intraoffice trunks to the A appearances and the terminating ends of intraoffice trunks and incoming trunks to the B appearances of the ninth levels.

As an example, a trunk link frame might have seven originating registers assigned in a dial tone route and appearing on the A appearances of the second level of trunk switches 0 to 6 of the frame and the remaining A and B appearances of the second level of the ten trunk switches might be assigned to a single outgoing route, three trunks of which route would terminate in the A appearances of the second levels of trunk switches 7, 8 and 9 and ten of which trunks would terminate in the B appearances of the second levels of switches 0 to 9 inclusive. A distribution of originating registers and trunks of the same outgoing route could be made in a similar manner to the A and B appearances of the switches of other trunk link frames.

Thus in searching for trunks available for extending a connection in a particular route, or for securing the services of an available originating register, it is first necessary for a marker taken into service for controlling the desired connection, to first ascertain if there is a trunk link frame on the switches of which idle trunks or originating registers of the desired route terminate, preferably not in use at the time by another marker, and to connect with such trunk link frame. It is then necessary for the marker to test for an idle trunk or register appearing on a switch of the selected frame and to cause the selection of such idle trunk.

It is the object of the present invention to afford simple and accurate facilities for thus testing for the availability of trunks or registers on frames and selecting an idle register or trunk of a desired route on one of the frames.

Figures 2, 4:
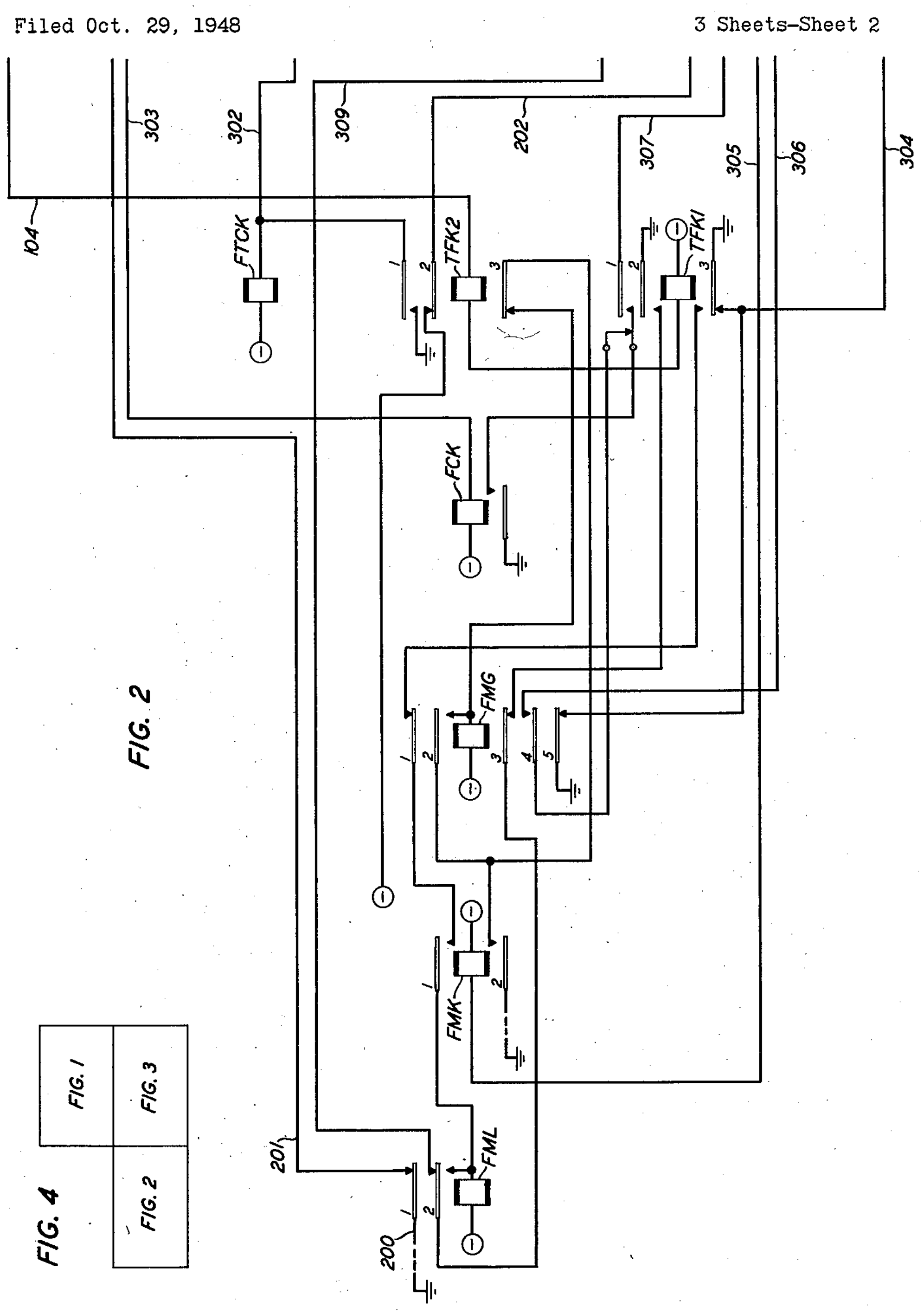
Figure 3:
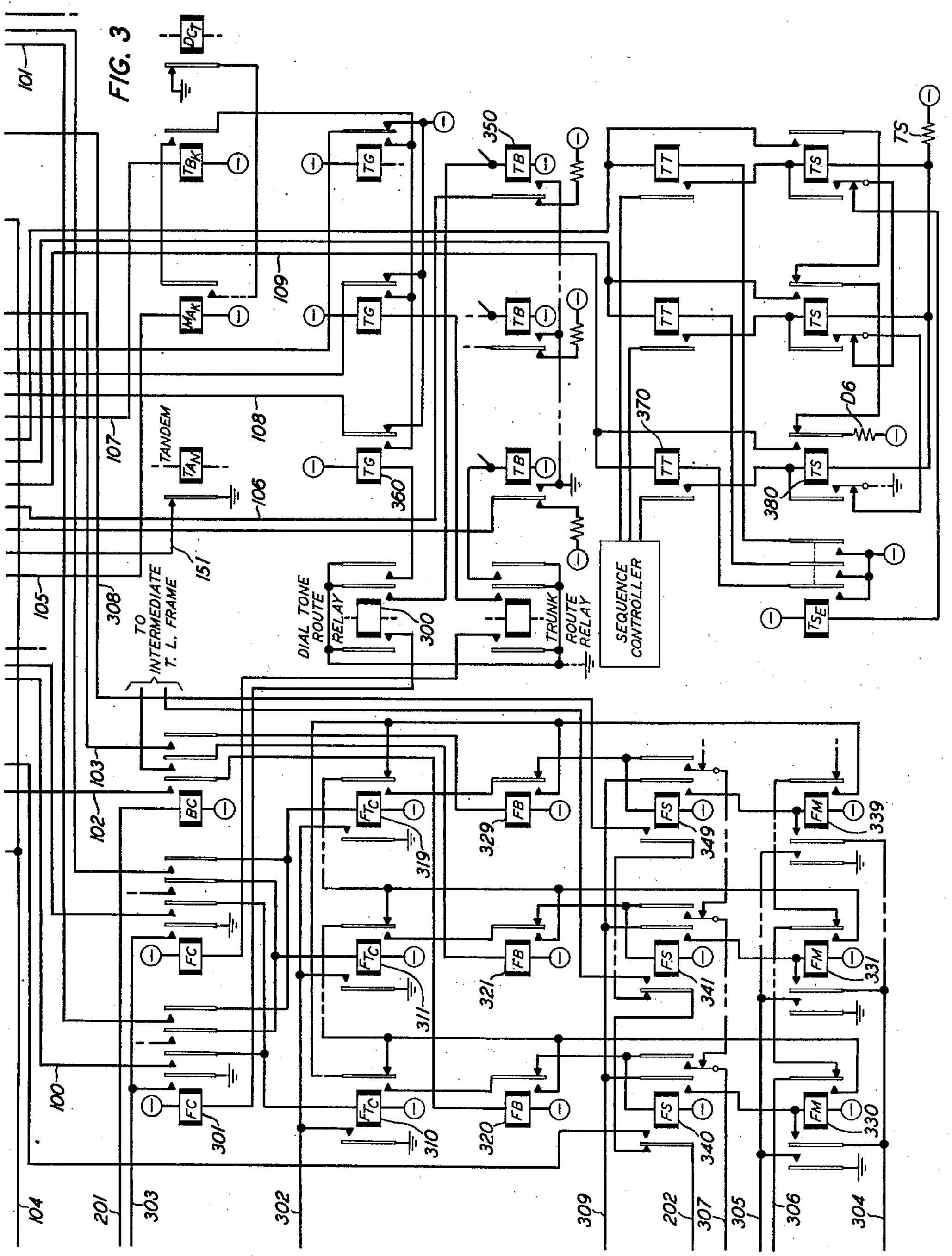

For a clearer understanding of the circuits and apparatus which have been provided in accordance with the present invention to attain the object stated, attention is directed to the following detailed description when read in connection with the accompanying drawing in which:

Fig. 1 shows schematically such portions of outgoing registers and trunks appearing on the trunk appearances of switches of a plurality of trunk link frames and the connector equipment of such trunk link frames as is deemed necessary for an understanding of the invention;

Figs. 2 and 3 taken together show such portions of a marker as are necessary to enable the selection of an idle register or idle trunk of a desired route; and Fig. 4 is a chart showing how Figs. 1 to 3 inclusive should be arranged to completely disclose the invention.

In Fig. 1, four trunks are schematically illustrated, two terminating on the No. 0 trunk frame and two terminating on the last or No. 9 trunk link frame and it will be assumed that these trunks and others not shown but which might terminate on others of the ten trunk link frames are allocated to the same outgoing trunk route which may be identified as route No. 59. Two originating registers are also schematically illustrated, one terminating on the No. 0 trunk link frame and one terminating on the No. 9 trunk link frame and these registers together with others which might terminate on others of the trunk link frames are allocated to the dial tone route No. 00.

It will now be assumed that the first of a group of markers, portions of which are shown schematically in Figs. 2 and 3, is taken into service for the purpose of selecting an idle originating register and that therefore ground has been applied to conductor 200 of Fig. 2 and the dial tone route relay 300 of Fig. 3 has been operated. Relay 300 upon operating establishes the circuit of the frame connector (FC) relay 301 allocated to the control of the selection of a trunk link frame on which there is an idle originating register. The route relay also establishes the circuits of one of six twenty-block (TB) relays and one of twenty trunk group (TG) relays for a purpose to be later described.

As many FC relays are provided in the marker as there are route relays or route numbers. These relays enable the marker to look at the trunk link frames for a particular route to determine by the operation of the FTC relays which trunk link frames have idle trunks (in the case assumed originating registers). All originating registers on each trunk link frame have their FT punchings bunched and cross-connected to an FTC punching corresponding to that one of the FC relays which has been operated for the dial tone or originating register route. If any one of the originating registers terminating on a particular trunk link frame is idle, the associated FT punching is connected to ground over the back contact of the "on" relay of the idle originating register and a frame test common relay (FTC) corresponding to the trunk link frame is operated. For example, assuming that there is an idle originating register on the No. 0 trunk link frame, the FTC punching thereof is connected over conductor 100 and the next to inner contacts of the FC relay 301, through the winding of the FTC relay 310 to battery. Assuming that there is also an idle originating register on the last or No. 9 trunk link frame, the FTC punching thereof is connected over conductor 101 and the outer contacts of relay 301 through the winding of the FTC relay 319 to battery, whereupon both relays 310 and 319 operate. The marker thus has a simultaneous record of all trunk link frames with idle originating registers. The availability of at least one trunk link frame having an idle originating register is checked in the marker by the operation of the frame test check relay FTCK in a circuit established over the left contacts of the operated FTC relays, conductor 302 and through the winding of the relay FTCK to battery. The frame check relay FCK of the marker is also operated in a circuit established over the inner contacts of the operated ones of the FC relays and conductor 303, thence through the winding of relay FCK to battery, indicative of the fact that a frame connector relay has been operated to initiate a frame test.

When ground is connected to conductor 200 to initiate the trunk testing functions of the marker, and provided the frame memory lock relay FML is normal, a circuit is established over the upper back contact of relay FML and conductor 201, through the winding of the busy cut-in relay BC whereupon relay BC is operated to connect the frame busy (FB) relays through to the corresponding trunk link frames. For example, a circuit is established from battery through the winding of the FB relay 320, over the inner contacts of relay BC to conductor 102 extending to the No. 0 trunk link frame, a circuit is established from battery through the winding of the FB relay 329 and over the outer contacts of relay BC to conductor 103 extending to the last or No. 9 trunk link frame and similar circuits are established through the windings of the other FB relays and other contacts of relay BC to other conductors extending to the other trunk link frames. It will be assumed that the No. 0 trunk link frame has been taken into use by another marker and that therefore the marker connector (MC) relay of that trunk link frame, allocated to that marker and corresponding to relay 110, has been operated and has connected ground over its right contacts to conductor 102. Therefore upon the operation of relay BC, the FB relay 320 corresponding to the No. 0 trunk link frame will be operated.

The preference for trunk link frames is rotated on a marker usage basis to equitably distribute calls to all trunk link frames. This is accomplished in the marker by storing the number of the trunk link frame used on the call in progress on the FM (frame memory) relays. It will be assumed that on the last call established by the marker disclosed over a trunk link frame, the marker used the No. 0 trunk link frame and that as a consequence thereof the frame memory relay 330 was operated and locked in its operated condition, over a circuit from battery through its winding, over its inner left contacts and conductor 304 to ground over the lower back contact of trunk frame check relay TFK1 or the lower back contact of the frame memory ground relay FMG. The marker is arranged to prefer from among the frames available for a call, one higher in number than the frame corresponding in number to the FM relay that is operated unless the only frame available corresponds to this operated relay. Whenever any one of the FM relays is operated, a circuit is established from ground over the left contacts thereof, over conductor 305 and through the winding of the frame memory check relay FMK to battery. Relay FMK upon operating establishes a circuit from ground over its lower contacts, over the lower back contact of the trunk frame check relay TFK2 and through the winding of relay FMG to battery whereupon relay FMG operates and locks in a circuit over its upper front contact to ground over the lower contacts of relay FMK.

As soon as one of the FTC relays operates, indicative of the fact that there is at least one available register on the corresponding trunk link frame, an attempt is made to operate the corresponding frame selection relay FS. It was assumed that there was an available orginating register on the No. 0 trunk link frame and that the FTC relay 310 of the marker was operated, but it was also assumed that another marker is at the time using the No. 0 trunk link frame and that the corresponding FB relay 320 is also operated. Therefore the circuit for the FS relay corresponding to the No. 0 trunk link frame cannot be completed since there is no closure therefor over the back contact of the operated FB relay 320. It is possible however, to establish the circuit of the FS relay 349 corresponding to the last or No. 9 trunk link frame since this frame is not being used by another marker as indicated by the unoperated FB relay 329 corresponding to such frame, such frame has an available orginating register as has been indicated by the operation of the FTC relay 319 and it will be assumed that there are no orginating registers available on the lower numbered frames with numbers inintervening between the No. 0 and the last frame as indicated by the unoperated condition of the corresponding FTC relay, such as relay 311. The circuit for the FS relay 349 may therefore be traced from battery through its winding, over the back contact of the FB relay 329, the right front contact of the FTC relay 319, the right back contacts of the lower numbered unoperated FTC relays including relay 311, the right front contact of the operated FM relay 330, over conductor 306, the lower front contact of relay FMG, the upper normal contacts of relay TFK1 and to ground over the contacts of the operated relay FCK.

It is to be noted that with any FM relay operated, the FS relay corresponding to the next higher numbered trunk link frame on which there are available registers, as indicated by the operation of the corresponding FTC relay, will be operated. Thus for example, with the FM relay 330 operated, if the FTC relay 311 should be operated, indicative of the fact that registers are available on the No. 1 trunk link frame, then the connection of ground over conductor 306 and the right front contact of relay 330 would be effective to establish a circuit over the right front contact of relay 311 and the right back contact of relay 321 and through the winding of the FS relay 341 to battery. Similarly, had the FM relay 339 been operated, and registers been available on the No. 0 trunk link frame and no other marker using such frame, then with the FTC relay 310 operated and the FB relay 320 unoperated, ground applied from conductor 306 over the right back contacts of the preceding FM relays 330, 331, etc. and the right front contact of operated FM relay 339 would be effective to establish a circuit extending over the right front contact of relay 310, the right back contact of relay 320 and through the winding of FS relay 340 to battery to cause the operation of relay 340 whereby the marker would bid for the use of the No. 0 trunk link frame in competition with other markers.

If the FM relay 330 is operated indicative of the fact that the marker on a preceding call used the No. 0 trunk link frame and it should be found on a succeeding call that the No. 0 trunk link frame is the only frame having available registers and that therefore the FTC relay 310 corresponding to that frame is the only FTC relay operated, then with the corresponding FB relay 320 unoperated indicative of the fact that no other marker is at the time using such frame, a circuit is effective for the FS relay 340 to cause the reselection of the No. 0 frame, from ground on conductor 306, over the right front contact of relay 330, back contacts of all FTC relays corresponding to higher numbered frames, over the right front contact of operated relay FTC 310, the right back contact of FB relay 320 and to battery through the winding of FS relay 340.

Relay 349 upon operating as previously described, bids for the last or No. 9 trunk link frame for use in securing the services of an originating register in competition with other markers by means of the marker preference circuits associated with such frame and connects to it by way of the trunk link frame connector.

Each marker in the office has access to each trunk link frame but only one marker at a time is allowed to connect to a frame. The circuits involved in this operation comprise the marker preference (MP) relays, one for each marker. When, for example, the intermediate marker whose MP relay is designated 139, bids for the last or No. 9 trunk link frame, relay 139 is operated in a circuit extending through its winding and over the right normal contacts of subsequent MP relays, such as 149, to ground unless one of such subsequent relays is operated indicative of the fact that the associated marker is using or waiting to use the same trunk link frame. If the MP relay 139 operates, it establishes over its inner left contacts, the operating circuit of an associated marker connector relay MC (not shown but corresponding to relay 119) to associate such marker with the trunk link frame, provided that no preceding MP relay such as relay 129 has operated to open such operating circuit at its inner left back contact.

The break contact chain over the right contacts of the MP relays insures that but one MP relay may be operated at one time and the break-make chain over the inner left contacts of the MP relays requires that only one MC relay will be operated at a time, whereas the make-break chain insures that the circuit to the MC relay associated with any one marker will not be opened once it is established, unless the marker is finished with the trunk link frame and releases its MP relay.

It will be assumed that relay 349, which has been operated, is successful in its bid for the last trunk link frame and establishes a circuit which may be traced from battery over the contacts of relays not shown, over the upper back contact of relay TFK2, conductor 202, the left back contacts of FS relays lower numbered than the operated FS relay 349, over the left front contact of relay 349, conductor 308, through the winding of the MP relay 129, over the back contacts of succeeding MP relays allocated to other markers, and to ground. Thereupon relay 129 operates and locks over its right contacts to ground and over its inner left contacts establishes the circuit of the MC (marker connector) relay 119 allocated to the first marker. It is to be noted that at its inner right back contact relay 129 removes ground from the chain circuit extending to subsequent MP relays so that should a subsequent MP relay operate, it will not be able to operate its associated MC relay.

As soon as the MC relay operates, assumed to be relay 119, it connects ground over its right contacts to conductor 103, whereupon the last trunk link frame is marked as in use by the marker to all other markers. The operation of the MP relay 129 is also effective to establish a circuit from ground over its outer left front contact, conductor 104 and in series through the windings of the trunk frame check relays TFK1 and TFK2 to battery whereupon these relays operate indicative of the fact that the marker has seized at trunk link frame for use. It is to be noted that the MP relays are provided with a chain circuit which steers ground to the check conductors 104 one at a time. This chain circuit is similar to the one previously described for controlling the MC relays.

Relay TFK1 upon operating establishes a locking circuit from ground, over the contacts of relay FCK, over the upper alternate contacts of relay TFK1, conductor 307, over the right normal contacts of preceding unoperated FS relays 340, 341, etc. and over the outer right contacts of the operated FS relay 349 and through the winding of such relay to battery for holding relay 349 operated. At its lower back contact relay TFK1 opens the locking circuit of the operated frame memory (FM) relay, assumed to be relay 330, whereupon such relay releases and opens the initial operating circuit for the FS relay 349. Relay 330 upon releasing also releases relay FMK which relay in turn opens the locking circuit of relay FMG whereupon the latter relay also releases, indicating that the marker is ready for setting up a new preferance of trunk link frame selection.

A circuit is now established for the FM relay 339 corresponding to the trunk link frame now taken for use by the marker which may be traced from battery through the winding of such relay, over the inner right contacts of operated FS relay 349, conductor 309, the inner back contact of relay FML, the inner lower back contact of relay FMG and to ground over the inner upper contacts of relay TFK1. Relay 339 upon operating locks over its outer left contacts and conductor 304 to ground at the lower back contact of relay FMG and over its outer left contacts and conductor 305 reestablishes the circuit of relay FMK which now reoperates and establishes the circuit of relay FML. The latter circuit may be traced from battery through the winding of relay FML, over the upper contacts of relay FMK, the upper back contact of relay FMG and to ground over the lower front contact of relay TFK1. Relay FML upon operating, locks over its upper front contact, the inner lower back contact of relay FMG, and to ground over the inner upper contacts of relay TFK1 and at its upper back contact opens the circuit of relay BC which releases and in turn releases any operated FB relays, in the case assumed, FB relay 320. The operation of relay FML signifies that the preference of trunk link frame selection has been completely recycled.

When the marker connector relay 119 operated as previously described, it established a plurality of control circuits between the No. 9 trunk link frame and the marker and established a circuit from ground over its No. 11 left contacts and conductor 105 through the winding of relay MAK to battery. Relay MAK thereupon operates as a check that the MC relay 119 has operated.

It will be recalled that when the route relay 300 of the marker operated it caused the operation of one of the TB relays and one of the TG relays of the marker. Within any one trunk link frame all originating registers will be grouped within one trunk block group. However, the same trunk block group may also contain other trunk groups. The identification of the trunk block group will identify within which group of twenty registers and trunks all of the originating registers are located. Identification of the trunk block group is made in the marker by the operation of one of the six trunk block (TB) relays. In the case assumed, the originating registers being located in the 00 route group, the operation of the dial tone route relay 300 has caused the operation of the TB-0 relay 350 and with the MC relay 119 operated, a circuit is established from ground over the front contact of relay 350, conductor 106, the No. 8 left contacts of relay 119 and through the winding of the TB-0 relay 150 of the No. 9 trunk link frame, whereupon relay 150 operates and establishes a circuit from ground over its outer contacts, over the No. 4 left contacts of relay 119, conductor 107 and through the winding of relay TBK to battery, whereupon relay TBK operates as an indication that a trunk block relay of the selected trunk link frame has operated and extended twenty busy test leads from the marker over contacts of the operated MC relay 119 to twenty registers or trunks.

However, testing for an idle and available originating register must be confined to the group of registers terminating on the trunk link frame and assumed to have their busy test leads extended to the marker over other contacts of the operated TB relay 150. Therefore the registers and trunks within every trunk block group are further divided into test groups. Each test group within a trunk block group will contain only registers of the same type or trunks which are identical. All of the originating registers in the No. 0 trunk block group, identified through the operation of TB relay 150, may be identified by specifying in addition to the trunk block group, the associated trunk group. The indication that a register or trunk is idle and available will be in the presence of ground on the associated BT lead in the register or trunk circuit. The marker by supplying this busy test ground to only those registers or trunks within the selected trunk group will exclude an idle indication from all other registers or trunks within the same trunk block group.

The identification of the trunk group is made within the marker by the operation of one of a group of twenty trunk group relays TG-0 to 19, under the control of the operated route relay. In the case assumed the dial tone route relay 300 has caused the operation of the TG-0 relay 360 indicative of the fact that an idle originating register is to be found in the 0 trunk group of the 0 trunk block or corresponding to route No. 00.

All originating registers terminating on switches of the last or No. 9 trunk link frame will have their F punchings bunched and connected to the TG punchings. As a typical example it was previously stated that there might be seven originating registers having A appearances on the No. 2 level of trunk switches 0 to 6 inclusive of this frame and therefore the F punchings of these seven registers would all be connected to the TG punching allocated to the originating register trunk group. This TG punching is now connected over the No. 3 left contacts of the MC relay 119, conductor 108, the front contact of TG relay 360 and over the front contacts of relays TBK, MAK and the back contact of relay DCT to ground.

At each register, the F punching is connected over the back contact of the "on" relay of the register, if the register is idle and through the winding of the F relay, and with ground connected to the F punching the circuits of the F relays of all idle registers are extended over contacts of the operated trunk block relay 150, contacts of the operated MC relay 119 and through the winding of test trunk relays TT of the marker to battery. Battery is supplied to these test circuits over contacts of relay TSE which is operated when all of the twenty test selection relays TS are normal. It having been assumed that there are seven originating registers terminating on switches of the No. 9 trunk link frame, busy test circuits for all of these registers will be extended through the windings of test trunk relays TT-0 to TT-6 inclusive and a simultaneous check of all seven of the registers will be made. If it is assumed that the register illustrated in Fig. 1 is idle and therefore the "on" relay thereof is unoperated, the busy test circuit therefor may be traced from ground on punching TG, over the left back contact of relay "on," through the winding of relay F of the register, the inner contacts of the TB relay 150, the No. 7 contacts of the MC relay 119, conductor 109 and through the winding of the TT–0 relay 370 to battery. Relay 370 operates in this circuit but the F relay of the originating register being marginal does not operate because of the high series resistance of the winding of relay 370. In a similar manner other TT relays will operate if the tested originating registers are idle.

Associated with each of the test trunk relays TT is a test selection relay TS. There are therefore twenty test selection relays and the selection preference of any one of these relays will vary with each connection set up by the marker through the operation of the sequence controller. It will, however, be assumed that the sequence controller has determined that of the idle registers which have caused the operation of the test trunk relays the circuit of the TS–0 relay 380 is completed from ground through the sequence controller, over contacts of the operated TT relay 370, through the winding of the TS relay 380 and through resistor TS to battery and relay 380 operates. By the opening of its left transfer contacts, the TS relay 380 opens the operating circuit of the TSE relay which releases in turn releasing all TT relays such as relay 370 which have been operated and preventing any nonoperated and prior preferred TT relay from operating to select a new originating register after an originating register has been selected for service.

With the TT relay 370 now released and the TS relay 380 operated, battery is connected through the low resistance D6, over the right front contact of relay 380, conductor 109 and thence as traced through the winding of the F relay of the selected originating register whereupon such relay operates and locks over its left contacts to ground applied to its F punching by the operation of TG relay 360 of the marker. Relay F over its right contacts establishes a circuit for the S1 relay of the register which is extended over the No. 10 left contacts of the MC relay 119 and conductor 151 to ground over the back contact of relay TAN. When the S1 relay operates, it causes the operation of the "on" relay which by opening its back contacts, marks the register as busy.

After the marker has successfully completed the connection between the selected originating register and the calling line and has made all necessary tests of the connection, the DCT relay is operated thereby removing ground from the locking circuit of relay F at the originating register and such register thereupon releases and opens the initial operating circuit of the S1 relay but the latter relay is held under the control of the calling line. The release of the operated route relay 300 of the marker in turn releases the operated FC relay 301, the TB relay 350 and the TG relay 360 thereby causing the release of the trunk block relay 150 of the trunk link frame and in turn relay TBK in the marker. When the FC relay 301 releases, relay FCK releases thereby opening the locking circuit of the operated FS relay 349 which thereupon releases. The FC relay 301 upon releasing also releases all operated FTC relays in turn releasing the FTCK relay.

The FS relay 349 upon releasing causes the release of the MP relay 129 associated with the seized No. 9 trunk line frame which in turn releases the MC relay 119. The MC relay 119 upon releasing in turn releases the TSK1, TSK2 and MAK relays in the marker. The release of the relay TSK1 in turn releases relay FML. The trunk link selection controls of the marker are now released and the No. 9 trunk link frame is now disconnected from the marker and may be seized by the same or another marker to establish another trunk connection.

In the preceding description it was assumed that the marker route relay 300 was operated to cause the selection of an originating register. The marker functions in a similar manner to make trunk selections. Thus if a trunk of an outgoing group represented by the trunks shown in Fig. 1 is to be selected, trunk route relay of the marker shown in Fig. 3 would be operated to cause the operation of the proper FC, TB and TG relays whereby a trunk link frame is first selected on which there are idle trunks in the desired trunk route and an idle trunk terminating on the selected frame is then selected. These selections are made in the manner previously described.

What is claimed is:

1. In a telephone system, a plurality of switch frames, a group of outgoing circuits, one or more of said circuits terminating on each of said switch frames, a common control circuit, means in said control circuit to simultaneously test a plurality of said frames for idle frames having at least one idle outgoing circuit terminating thereon, means responsive to said testing means to select one of said idle frames and to connect said control circuit with said selected frame, and means thereupon effective to select an idle one of the outgoing circuits which terminate on the selected frame.

2. In a telephone system, a plurality of switch frames, a group of outgoing circuits, ones or more of said circuits terminating on each of said switch frames, common control circuits, means in a control circuit to simultaneously test a plurality of said frames for frames on which there are idle outgoing circuits, means in said control circuits to simultaneously test said plurality of frames for frames which have been rendered busy by others of said control circuits, means responsive to the joint control of both of said testing means to select one of said frames which has not been made busy and on which idle outgoing circuits terminate and to connect said control circuit with said selected frame, and means thereupon effective to select an idle one of the outgoing circuits which terminate on the selected frame.

3. In a telephone system, a plurality of switch frames, a group of outgoing circuits, one or more of said circuits terminating on each of said switch frames, common control circuits having access to said switch frames, means in each of said control circuits to simultaneously test a plurality of said frames for idle frames having at least one idle outgoing circuit terminating thereon, means individual to each of said control circuits responsive to the testing means of the respective control circuits for connecting said control circuits in a definite order of preference with any one of said idle frames when more than one control circuit is simultaneously bidding for the use of said idle frames, and means thereafter effective to select an idle one of the outgoing circuits which terminate on the selected frame.

4. In a telephone system, a plurality of switch frames, a group of outgoing circuits, one or more of said circuits terminating on each of said switch frames, common control circuits having access to said switch frames, means in each of said control circuits to simultaneously test a plurality of said frames for idle frames having at least one idle outgoing circuit terminating thereon, connector relays for each frame individualized to said control circuits, preference relays for each frame individualized to said control circuits, preference circuits responsive to the testing means of respective control circuits for operating said preference relays in a definite order of preference when more than one control circuit is simultaneously bidding for the use of any idle frame, preference circuits for the connector relays of each frame controlled by the preference relays of the same frame for insuring the operation of the connector relay appertaining to the preferred control circuit, to connect the preferred control circuit with said frame, and means thereafter effective to select an idle one of the outgoing circuits which terminate on the selected frame.

5. In a telephone system, a plurality of switch frames, a group of outgoing circuits, one or more of said circuits terminating on each of said switch frames, a common control circuit having access to said frames, means in said control circuit for controlling the selection of idle frames on a preferential basis determined by the usage of said frames by said control circuit on preceding calls, means in said control circuit to simultaneously test a plurality of said frames for idle frames having at least one idle outgoing circuit terminating thereon, means responsive to said latter means to preferentially select an idle frame having the next higher number than the frame used by said control circuit on the preceding call, means to connect said control circuit with said selected frame and means thereupon effective to select an idle one of the outgoing circuits which terminate on the selected frame.

6. In a telephone system, a plurality of switch frames, a group of outgoing circuits, one or more of said circuits terminating on each of said switch frames, a common control circuit having access to said frames, frame memory relays in said control circuit, means to selectively operate one of said memory relays to register the identity of the frame seized by the control circuit on any call in progress, means to hold said one memory relay operated at the end of the seizure, means in said control circuit to simultaneously test a plurality of said frames for idle frames having idle outgoing circuit terminating thereon, means responsive to said latter means and controlled by the memory relay held operated to preferentially select an idle frame having the next higher number than the frame indicated by the held memory relay as having been used by the control circuit on the preceding call, means to connect said control circuit with said selected frame and means thereafter effective to select an idle one of the outgoing circuits which terminate on the selected frame.

7. In a telephone system, a plurality of switch frames, a group of outgoing circuits, one or more of said circuits terminating on each of said switch frames, a common control circuit having access to said frames, frame memory relays in said control circuit, means to selectively operate one of said memory relays to register the identity of the frame seized by the control circuit on any call in progress, means to hold said one memory relay operated at the end of the seizure means in said control circuit to simultaneously test a plurality of said frames for idle frames having at least one idle outgoing circuit terminating thereon, means responsive to said latter means and controlled by said held memory relay to preferentially select an idle frame having the next higher number than the frame indicated by the held memory relay, means to seize said selected frame and connect said control circuit therewith, means operated in response to the seizure of said frame to release the held memory relay and to operate the memory relay corresponding to the frame seized, and means thereafter effective to select an idle one of the outgoing circuits which terminate on the selected frame.

8. In a telephone system, a plurality of switch frames, a group of outgoing circuits, one or more of said circuits terminating on each of said switch frames, a common control circuit having access to said frames, means in said control circuit for controlling the selection of idle frames on a preferential basis determined by the usage of said frames by said control circuit on preceding calls, means in said control circuit to simultaneously test a plurality of said frames for idle frames having at least one idle outgoing circuit terminating thereon, means responsive to said latter means to preferentially select an idle frame having the next higher number than the frame used by said control circuit on the preceding call, said responsive means being effective to select the same frame used by the control circuit on the preceding call if said frame is the only idle frame having idle outgoing circuits, means to connect said control circuit with said selected frame and means thereafter effective to select an idle one of the outgoing circuits which terminate on the selected frame.

9. In a telephone system, a plurality of switch frames, a group of outgoing circuits, one or more of said circuits terminating on each of said switch frames, common control circuits having access to said frames, means in each of said control circuits for controlling the selection of idle frames on a preferential basis determined by the usage of said frames by said control circuits on preceding calls, means in each of said control circuits to simultaneously test for frames which have been rendered busy by others of said control circuits, means in each of said control circuits to simultaneously test for frames on which there are idle outgoing circuits, means responsive to the joint control of said preceding three means of any control circuit to connect such control circuit with an idle frame having the next higher number than the frame used by such control circuit on the preceding call, and means thereafter effective to select an idle one of the outgoing circuits which terminate on the selected frame.

10. In a telephone system, a plurality of switch frames, a plurality of groups of outgoing circuits, one or more circuits of any one of said groups terminating on each of said frames, a common control circuit, a route relay in said control circuit operative to determine the desired group of outgoing circuits from which the selection of an idle one is to be made, means in said control circuit responsive to said relay to simultaneously test a plurality of said frames for idle frames having at least one idle outgoing circuit of the desired group terminating thereon, means responsive to said testing means to select one of said idle frames and to connect said control circuit with the selected frame, trunk block relays on said selected frame selectively operable under the control of said route relay to select a plurality of outgoing circuits including the circuits of the desired group for testing, means in said control circuit for rendering the outgoing circuits of the desired group effectively testable, and means in said control circuit jointly controlled by said latter means and by said selected block relay to select an idle one of the outgoing circuits of the desired group.

11. In a telephone system, a plurality of switch frames, a plurality of groups of outgoing circuits, one or more circuits of any one of said groups terminating on each of said frames, a common control circuit, a route relay in said control circuit operative to determine the group of outgoing circuits from which the selection of an idle one is to be made, means in said control circuit responsive to said relay to simultaneously test for idle frames having at least one idle outgoing circuit of the desired group terminating thereon, means responsive to said testing means to select one of said idle frames, means to connect said control circuit with said selected frame trunk block relays on said selected frame selectively operable under the control of said group relay to select a plurality of outgoing circuits including the circuits of the desired group for testing, means in said control circuit responsive to said route relay for supplying test potential to only such outgoing circuits from the selected plurality as are allocated to the desired group, and means in said control circuit responsive to said test potential for selecting an idle one of the outgoing circuits of the desired group.

12. In a telephone system, a plurality of switch frames, a plurality of groups of outgoing circuits, one or more circuits of any one of said groups terminating on each of said frames, a common control circuit, a route relay in said control circuit operative to determine the desired group of outgoing circuits from which the selection of an idle one is to be made, means in said control circuit responsive to said relay to stimultaneously test for idle frames having at least one idle outgoing circuit of the desired group terminating thereon, means responsive to said testing means to select one of said idle frames, means to connect said control circuit with said selected frame trunk block relays on said selected frame selectively operable under the control of said relay to select a plurality of outgoing circuits including the circuits of the desired group for testing, means in said control circuit responsive to said route relay for supplying test potential to only such outgoing circuits of the selected plurality as are allocated to the desired group, a plurality of test relays in said control circuit for simultaneously testing the outgoing circuits to which test potential has been applied, and means for preferentially selecting one of the outgoing circuits found to be idle by one of said test relays.

13. In a telephone system, a switch frame, a plurality of groups of outgoing circuits terminating on said frame, a common control circuit, means for associating said control circuit with said frame, a route relay in said control circuit operative to determine the desired group of outgoing circuits from which the selection of an idle one is to be made, trunk block relays on said frame selectively operable under the control of said route relay to select a plurality of outgoing circuits including the circuits of the desired group for testing, means in said control circuit for rendering the outgoing circuits of the desired group effectively testable, and means in said control circuit jointly controlled by said latter means and by said selected block relay to select an idle one of the outgoing circuits of the desired group.

14. In a telephone system, a switch frame, a plurality of groups of outgoing circuits terminating on said frame, a common control circuit, means for associating said control circuit with said frame, a route relay in said control circuit operative to determine the desired group of outgoing circuits from which the selection of an idle one is to be made, trunk block relays on said frame selectively operable under the control of said route relay to select a plurality of outgoing circuits including the circuits of the desired group for testing, means in said control circuit responsive to said route relay for supplying test potential to only such outgoing circuits of the selected plurality as are allocated to the desired group, and means in said control circuit responsive to said test potential for selecting an idle one of the outgoing circuits of the desired group.

15. In a telephone system, a switch frame, a plurality of groups of outgoing circuits terminating on said frame, a common control circuit, means for associating said common control circuit with said frame, a route relay in said control circuit operative to determine the desired group of outgoing circuits from which the selection of an idle one is to be made, trunk block relays on said switch frame selectively operable under the control of said route relay to select a plurality of outgoing circuits including the circuits of the desired group for testing, means in said control circuit responsive to said route relay for supplying test potential to only such outgoing circuits of the selected plurality as are allocated to the desired group, a plurality of test relays in said control circuit for simultaneously testing the outgoing circuits to which test potential has been applied, and means for preferentially selecting one of the outgoing circuits found to be idle by one of said test relays.

16. In a telephone system, a switch frame, a plurality of groups of outgoing circuits terminating on said frame, each of said circuits having a relay operable upon the seizure thereof when idle to cause such circuit to be marked as busy, a common control circuit, means for associating said control circuit with said frame, a route relay in said control circuit operative to determine the desired group of outgoing circuits from which the selection of an idle one is to be made, trunk block relays on said frame selectively operable under the control of said route relay to select a plurality of outgoing circuits including the circuits of the desired group for testing, means in said control circuit responsive to said route relay for supplying test potential to only such outgoing circuits of the selected plurality as are allocated to the desired group, a plurality of test relays in said control circuit connectable to the outgoing circuits of the plurality selected by said operated trunk block relay and simultaneously operable in series with the relays of such outgoing circuits as have been supplied with test potential and are idle, and means in said control circuit preferentially operated in response to an operated one of said test relays for causing the operation of the relay of the corresponding outgoing circuit to mark such outgoing circuit as selected.

17. In a telephone system, a switch frame, a plurality of groups of outgoing circuits terminating on said frame, each of said circuits having a relay operable upon the seizure thereof when idle to cause such circuit to be marked as busy, a common control circuit, means for associating said control circuit with said frame, a route relay in said control circuit operative to determine the desired group of outgoing circuits from which the selection of an idle one is to be made, trunk block relays on said frame selectively operable under the control of said route relay to select a plurality of outgoing circuits including the circuits of the desired group for testing, means in said control circuit responsive to said route relay for supplying test potential to only such outgoing circuits of the selected plurality as are allocated to the desired group, a plurality of test relays in said control circuit connectable to the outgoing circuits of the plurality selected by said operated trunk block relay and simultaneously operable in series with the relays of such outgoing circuits as have been supplied with test potential and are idle, and means in said control circuit preferentially operated in response to an operated one of said test relays for causing an increased flow of current through the relay of the corresponding outgoing circuit whereby said relay is operated to mark such outgoing circuit as selected.

RALPH E. HERSEY.

REFERENCES CITED

The following references are of record in the file of this patent:

UNITED STATES PATENTS

| Number | Name | Date |
|---|---|---|
| 2,235,803 | Carpenter | Mar. 18, 1941 |
| 2,261,370 | Hersey | Nov. 4, 1941 |
| 2,392,089 | Hersey | Jan. 1, 1946 |